United States Patent [19]
Hollmann

[11] Patent Number: 5,483,347
[45] Date of Patent: Jan. 9, 1996

[54] NON-CONTACT MEASUREMENT APPARATUS USING BIFURCATED OPTICAL FIBER BUNDLE WITH INTERMIXED FIBERS

[75] Inventor: Joerg W. Hollmann, Midland, Canada

[73] Assignee: Hughes Aircraft Company, Los Angeles, Calif.

[21] Appl. No.: 67,500

[22] Filed: May 19, 1993

[51] Int. Cl.⁶ ..................................... G01B 11/14
[52] U.S. Cl. ..................... 356/375; 356/373; 250/227.11
[58] Field of Search .................... 356/373, 375; 250/227.28, 227.11, 227.21

[56] References Cited

U.S. PATENT DOCUMENTS

| | | | |
|---|---|---|---|
| Re. 34,345 | 8/1993 | Vinarub et al. | 356/384 |
| 4,750,835 | 6/1988 | McMurtry | 250/227.28 |
| 4,786,176 | 11/1988 | Froome | 356/373 |
| 5,063,290 | 11/1991 | Kersey | 356/351 |

*Primary Examiner*—Richard A. Rosenberger
*Assistant Examiner*—Robert Kim
*Attorney, Agent, or Firm*—Michael W. Sales; Wanda K. Denson-Low

[57] ABSTRACT

A non-contact measurement apparatus (10) includes a bifurcated bundle of optical fibers (12), a first arm (14) of which is adapted to receive light from a light source (24) and direct the light toward a surface (32) to be measured and a second arm (16) of which is adapted to convey light from the surface (32) to a light detector (26) such that the light intensity received by the detector (26) is indicative of the position of the surface (32).

20 Claims, 1 Drawing Sheet

5,483,347

NON-CONTACT MEASUREMENT APPARATUS USING BIFURCATED OPTICAL FIBER BUNDLE WITH INTERMIXED FIBERS

BACKGROUND OF THE INVENTION

The present invention generally relates to a non-contact measurement apparatus and, in particular, relates to one such non-contact measurement apparatus having a bifurcated bundle of optical fibers, a first portion of which are adapted to receive light from a light source and a second portion of which are adapted to convey light to a light detector.

In general, one of the more common methods of optically determining the thickness of a lens, or other reflective surface, is by laser interferometry. In such an instrument, the laser is directed toward the surface and the reflected interferogram is formed in accordance with the rules of light cancellation or reenforcement depending upon the phase of the signals. For example, if the reflected light is one hundred and eighty degrees out of phase with the incident light the light reflected is canceled and a dark ring is exhibited on the interferogram. It is well known that laser interferometers are capable of measuring very small changes in the thickness of an optical material. However, such techniques are quite expensive and introduce problems relating to eye safety. Further, such techniques, to operate most efficiently, require a highly reflective surface.

Other methods and instruments for measuring the thickness of lenses include ultrasonic systems and astigmatic and knife edge focus systems. Typically, however, ultrasonic systems od not have high accuracy although they are relatively inexpensive. Astigmatic and knife edge focus systems are typically used in data storage systems and are affected by both surface tilt and surface quality.

Hence, it is highly desirable to provide a non-contact measuring apparatus for measuring the thickness of an object that is highly accurate and relatively inexpensive.

SUMMARY OF THE INVENTION

Accordingly, it is one object of the present invention to provide a non-contact measuring apparatus that overcomes the above-recited drawbacks of similar conventional apparatus.

This object is accomplished, at least in part, by a non-contact measuring apparatus having a bifurcated bundle of optical fibers, a first portion of which is adapted to convey light from a light source and direct it toward a surface to be measured and a second portion of which is adapted to convey light to a detector such that the light intensity received via the second portion is indicative of the position of the surface.

Other objects and advantages of the present invention will become apparent to those skilled in the art from the following detailed description of the invention read in conjunction with the appended claims and the drawings attached hereto.

BRIEF DESCRIPTION OF THE DRAWINGS

The drawing, not drawn to scale, includes.

DETAILED DESCRIPTION OF THE INVENTION

Figure 1:
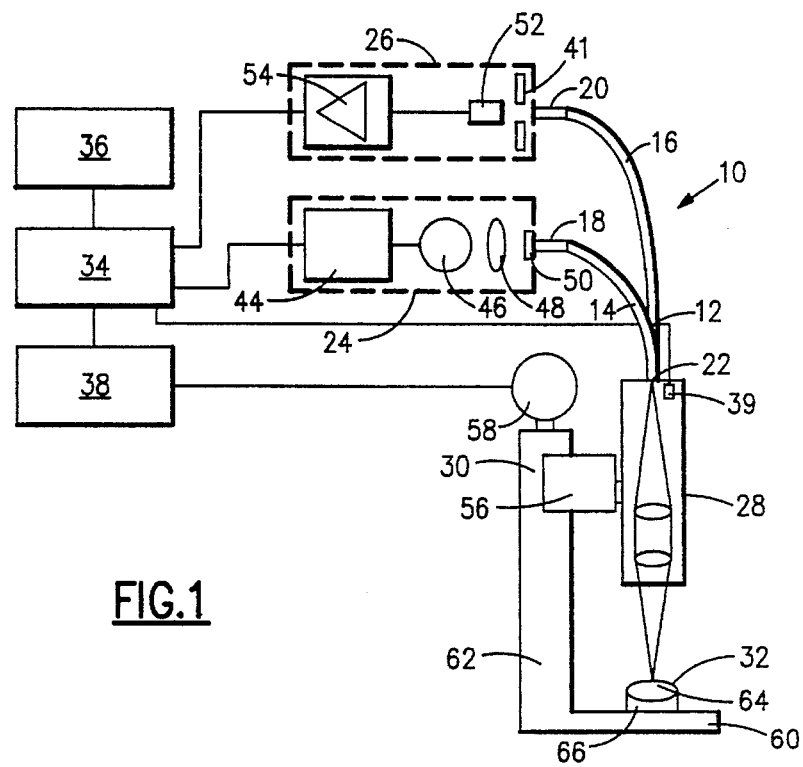
FIG. 1 which is a block diagram of an apparatus embodying the principles of the present invention.

An apparatus, generally indicated at 10 in the drawing and embodying the principles of the present invention, for non-contact measurements includes a bifurcated cable 12 of optical fibers having first and second arms, 14 and 16, respectively, each arm, 14 and 16, having a first end, 18 and 20, respectively, and a common second end 22, means 24 for providing light to the first end 18 of the first arm 14, means 26 for detecting light from the first end 20 of the second arm 16, a lens assembly 28 and means 30 for introducing relative motion between the lens assembly 28 and a surface 32 to be measured. Preferably, in one preferred embodiment, the apparatus 10 further includes means 34 for controlling the apparatus 10, means 36 for recording the output of the apparatus 10, means 38 for regulating the power to the means 30 for introducing relative motion between the common second end 22 of the bifurcated cable 12 and the surface 32 to be measured, means 39 for monitoring the ambient temperature within the lens assembly 28, and means 41 for selecting the optical wavelength reaching the means 26 for detecting light.

Figure 2:
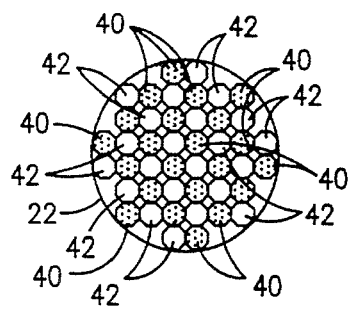
FIG. 2 which is an end view of a bundle of optical fibers particularly adapted for use in conjunction with the apparatus shown in FIG. 1.

In one particular embodiment, the bifurcated cable 12 can be any commercially available optical fiber cable that has the optical fibers thereof split into the first and second arms, 14 and 16, respectively. The arms, 14 and 16, are terminated in a conventional manner at the first ends, 18 and 20, thereof. Preferably, as shown in FIG. 2, the ends 40 of the individual optical fibers of the first arm 14 and the ends 42 of the individual optical fibers of the second arm 16 are intermixed with each other. As a result of this intermixing, as more fully discussed below, the reflections from the surface 32 to be measured are substantially equally distributed across the common end 22 of the bifurcated cable 12. Hence, the determination of the point of minimum light reflection to the means 26 for detecting light from the first end 16 is more positionally accurate than if all of the ends 40 and all of the ends 42 were adjacent each other. In one specific embodiment, each of the arms, 14 and 16, has about 800 individual optical fibers and the common second end 22 is about 2.2 millimeters in diameter.

In this preferred embodiment, the means 24 for providing light to the first end 18 of the first arm 14 of the bifurcated cable 12 includes a lamp power regulator 44 that is powered by the system control means 34, a non-coherent light source 46 powered through the power regulator 44, a lens 48 disposed in the path of light emanating from the light source 46 and a heat absorbing filter 50 disposed between the lens 48 and the first end 14 of the of the bifurcated cable 12. In one specific embodiment, the light source 46 is a halogen lamp, the lens 48 is, in this embodiment, a 5 to 1 microscope objective having a 37 millimeter working distance, a focal length of 31 millimeter, and an aperture of 0.143. The heat absorbing filter 50 absorbs heat generated from the light source 46. Alternatively, the light source 46 can be a light emitting diode.

In this embodiment, the means 26 for detecting light from the first end 20 of the second arm 16 includes a light detector 52 and a signal amplifier 54. The light detector 52 generates an electrical signal dependent upon the intensity of the light received. The light detector 52 outputs the electrical signal to the signal amplifier 54 which is connected to the control means 34. Typically, the light detector 52 is a silicon photodiode. Further, in one preferred embodiment, the means 41 for selecting the optical wavelength reaching the means 26 for detecting light is disposed between the first end 20 of the second arm 16 and the light detector 52. Preferably, the means 41 for selecting the optical wavelength includes at least one optical transmission bandpass filter. The optical transmission bandpass filter is used to maximize the reflected optical signal from the workpiece. Hence, the optical reflection wavelength resulting from such things as fingerprints on the workpiece or multiple reflections from optical coatings can be minimized.

The lens assembly 28 is a high quality transfer lens having a known focal point. Preferably, the focal point is precisely determined by measurements using a known gauge block. In this embodiment, the lens assembly 28 is sealed to prevent atmospheric disturbances from affecting the measurements and mounted to an arm member 56 of the means 30 for introducing relative motion between the lens assembly 28 and the surface 32 to be measured. In one embodiment, the movement of the arm member 56 is controlled by a stepper motor 58 controlled by the power regulator 38. Further, the means 30 for introducing relative motion between the lens assembly 28 and the surface 32, in one embodiment, includes a base member 60 rigidly affixed to a vertical member 62, or post, to which the arm member 56 is slidably mounted.

In one preferred embodiment, the means 39 for monitoring the ambient temperature within the sealed lens assembly 28 includes a conventional temperature sensor connected to the control means 34. Typically, the temperature sensor is used by the control means 34 to compensate for changes in the index of refraction of the air within the sealed lens assembly 28 due to temperature. The temperature sensor can be initialized to provide a temperature reference at start-up and thereafter provide a measurement such that the control means 34 can make compensations for the measurements taken for the effects of temperature changes.

The control means 34 can be any computerized mechanical control system including a computer adapted for use in controlling the power regulator 38, controlling the means 24 for providing light, receiving and processing signals from the means 26 for detecting light, and providing an output signal to the means 36 for recording the output of the apparatus 10.

In one specific embodiment, the means 36 for recording the output of the apparatus 10 includes a memory disk and a printer. In addition, the means 36 may also include other recording devices such as a video display, or the like.

In one exemplary operation, a spherical lens 64, the axial thickness of which is to be measured, is placed in a fixture 66 of accurately known dimensions. As the lens 48 or the surface 32 is moved with respect to the axis of the lens assembly 28 light from the first arm 14 of the bifurcated optical fiber cable 12 is reflected from the surface 32 and received through the second arm 16 and detected at the light detector 52.

Figure 3:
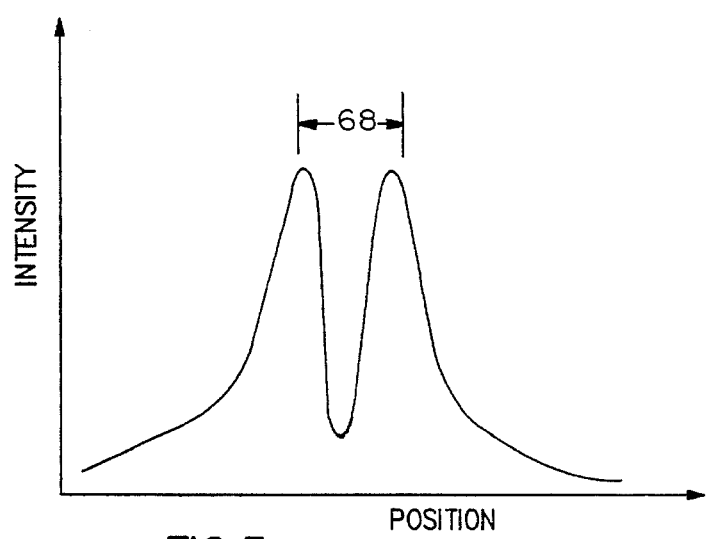
FIG. 3 which is a graph showing a typical position vs. intensity plot (intensity profile) as determined by the apparatus shown in FIG. 1.

The amount of light measured at the light detector 52 steadily increases as the position of the surface 32 moves with respect to the lens assembly 28. However, when the thickest point of the surface 32 of the lens 64 approaches the preset focal point of the lens assembly 28, the light reflected back to the common end point 22 is preferentially imaged onto the fibers of the first arm 14 from which it came. Consequently, the light returns to the light providing means 24 rather than going to the light detector 52. As shown in FIG. 3, this results is a dip 68 in the signal intensity. As the lens assembly 28 continues to move across the surface 32 the intensity of the signal increases again. The minimum position of the dip 68 is therefore taken as a measurement of the axial line of the lens 64.

It will be understood that a thickness measurement in absolute terms can be achieved by calibrating the apparatus 10 against an appropriate gauge block or master lens. The accuracy is then substantially determined by that of the gauge block or master lens.

In order to remove any backlash effects from the measurements, the procedure is preferably used with the lens assembly 28 always moving in the same direction.

Hence, it can be recognized that the non-contact measurement apparatus 10 is advantageous in that it can be particularly adaptable in the comparison measurements of a number of lenses. That is, once the focal point is set, a plurality of similar lenses can be measured and the acceptability of each determined.

Although the present invention has been described herein with respect to one or more particular embodiments, it will be understood that other configurations and arrangements can be made without departing from the spirit and scope of this invention. Thus, the present invention is deemed limited only by the appended claims and the reasonable interpretation thereof.

What is claimed is:

1. A non-contact measurement apparatus for measuring a physical characteristic of an article, comprising:

a bifurcated bundle of optical fibers having first and second arms and a common end, each arm having a first and second plurality respectively of intermixed fiber;

means for providing polychromatic light to said common end through said first arm, said means including a non-coherent lamp, a lamp lens disposed between said lamp and said first arm of said bifurcated bundle of optical fibers, and a heat absorbing filter disposed between said lamp lens and said first arm of said bifurcated bundle of optical fibers;

a lens assembly for focusing light transmitted from said common end onto a surface of said article, said lens assembly being connected to said common end and having a fixed focal point;

means for introducing relative motion between said lens assembly and said surface;

means connected to said second arm for detecting light reflected from said surface through said second arm, said light detecting means for generating a signal indicative of the intensity of light detected; and a band pass filter disposed between said second arm and said light detecting means for providing light at a single wavelength to said detection means;

means for controlling said apparatus, said control means regulating said means for providing light and for processing said signal generated by said means for detecting light to generate information indicative of said physical characteristic.

2. The apparatus as claimed in claim 1 wherein said non-coherent lamp is a halogen lamp.

3. The apparatus as claimed in claim 1 wherein said non-coherent lamp is a light emitting diode.

4. The apparatus as claimed in claim 1 wherein said light providing means further includes a lamp power regulator.

5. The apparatus as claimed in claim 1 wherein said light detecting means includes a light detector disposed to receive light from said second arm of said bifurcated bundle of optical fibers and generating an electrical signal dependent upon the intensity of light received from said second arm.

6. The apparatus as claimed in claim 5 wherein said light detecting means further includes a signal amplifier for amplifying said electrical signal generated by said light detector.

7. The apparatus as claimed in claim 5 further comprising means, disposed between said second arm of said bifurcated bundle of optical fibers and said light detector, for selecting the optical wavelength reaching said light detector.

8. The apparatus as claimed in claim 1 wherein said means for introducing relative motion includes a vertical member, said vertical member having an arm member slidably mounted thereon, said lens assembly being affixed to said arm member.

9. The apparatus as claimed in claim 8 wherein said means for introducing relative motion further includes a base member, said base member being mounted to said vertical member and adapted to support a surface to be measured.

10. The apparatus as claimed in claim 1 wherein said means for introducing relative motion includes a stepper motor.

11. The apparatus as claimed in claim 10 further comprising: means for regulating power to said stepper motor.

12. The apparatus as claimed in claim 1 wherein the optical fibers of said first arm and the optical fibers of said second arm are intermixed with each other at said common end.

13. The apparatus as claimed in claim 1 further comprising: means for recording the output from said means for detecting light.

14. The apparatus as claimed in claim 1 wherein said lens assembly is sealed and includes means for monitoring the ambient temperature therewithin.

15. The apparatus as claimed in claim 14 wherein said means for monitoring the ambient temperature includes a temperature sensor disposed within said sealed lens assembly and being connected to said control means for controlling said apparatus.

16. A noncontact method for measuring a physical characteristic of an article, comprising the steps of:

providing a bundle of optical fibers having a common end and bifurcated first and second arms, said first and second arms including a first and second plurality of optical fibers respectively intermixed over a cross-section of said common end;

providing a lens assembly having a fixed focal point and a detection assembly;

transmitting polychromatic light through said first arm and lens assembly to a surface of said article and providing a heat absorbing filter disposed between said lens assembly and said first arm of said bifurcated bundle of optical fibers;

providing a bandpass filter between said second arm and said detection assembly to provide light at a single wavelength to said detection assembly;

moving said surface relative to said lens assembly; and receiving light reflected from said surface through said second arm in said detector assembly to provide intensity signals indicative of said characteristic.

17. The method claim 16 wherein said optical fibers said first and second ends are intermixed equally across a cross section of said common end.

18. The method claim 16 wherein said light source is a noncoherent light source.

19. The method of claim 16 further comprising the steps of:

providing a control system, including a computer, to regulate said light source and to process said intensity signals to generate information indicative of the characteristic.

20. The method of claim 19 further including the steps of:

sensing the temperature of the lens assembly to provide a temperature signal;

processing said temperature signal using said control system to account for temperature variations when generating information indicative of the characteristic.

* * * * *